United States Patent [19]

Stansfield et al.

[11] Patent Number: 4,965,754
[45] Date of Patent: Oct. 23, 1990

[54] IMAGE PROCESSING

[75] Inventors: Peter W. Stansfield, Hertfordshire; Alastair Reed, Leighton Buzzard, both of England

[73] Assignee: Crosfield Electronics Limited, London, England

[21] Appl. No.: 176,588

[22] Filed: Apr. 1, 1988

[30] Foreign Application Priority Data

Apr. 3, 1987 [GB] United Kingdom ............... 8708010

[51] Int. Cl.$^5$ ............................................. G06F 15/20
[52] U.S. Cl. ................................... 364/526; 364/900; 364/920.7; 364/951.3; 358/133; 382/56
[58] Field of Search ........... 364/526, 900, 521, 715.02, 364/514; 382/17, 56; 358/260, 12, 13, 133, 75, 80, 426, 430

[56] References Cited

U.S. PATENT DOCUMENTS

| | | | |
|---|---|---|---|
| 4,103,287 | 7/1978 | Frank | 382/56 |
| 4,191,974 | 3/1980 | Ono et al. | 358/261 |
| 4,224,678 | 9/1980 | Lynch et al. | 364/715.02 |
| 4,225,850 | 9/1980 | Chang et al. | 382/56 |
| 4,300,122 | 11/1981 | McMahon | 382/56 |
| 4,364,024 | 12/1982 | Paetsch | 364/900 |
| 4,555,802 | 11/1985 | Fedak et al. | 364/900 |
| 4,559,563 | 12/1985 | Joiner, Jr. | 358/430 |
| 4,673,977 | 6/1987 | Stelzenmuller | 382/56 |
| 4,750,138 | 6/1988 | Immink | 364/514 |
| 4,757,552 | 7/1988 | Asano et al. | 382/56 |
| 4,788,598 | 11/1988 | Ochi et al. | 382/56 |
| 4,839,738 | 6/1989 | Kaku et al. | 358/426 |

FOREIGN PATENT DOCUMENTS 0096219 2/1987 European Pat. Off. .
2508747 12/1982 France .
0169086 7/1986 Japan .

OTHER PUBLICATIONS

Woods et al.; "Subband Coding of Images"; IEEE Transaction on Acoustics, and Signal Processing; (1986).
Yamaguchi; "Vector Quantization of Differential Luminance and Luminance and Chrominance Signals"; IEEE Transactions on Communication; May 1985.
Chen et al.; "Scene Adaptive Coder"; IEEE Transactions on Communications; Mar. 1984.
Adaptive Coding of Color Images Using Cosine Transform, Chen et al., pp. 47-7-47-13 IEEE Transaction Com. 1977.
Adaptive Transform Image Coding for Human Analysis, Mitchell et al., pp. 23.2.1-23.2.5 IEEE Transaction Com. 1977.

Primary Examiner—Gary Chin
Assistant Examiner—Ellis B. Ramirez
Attorney, Agent, or Firm—Sughrue, Mion, Zinn, Macpeak & Seas

[57] ABSTRACT

A method and apparatus for processing digital data representing the color content of abutting blocks of pixels defining an image. The method comprises, for each block (i) determining a measure of the variation in color content of pixels in the block; and,
(ii) if the variation lies within a predetermined range, applying a compression algorithm to the digital data defining the block.

8 Claims, 3 Drawing Sheets

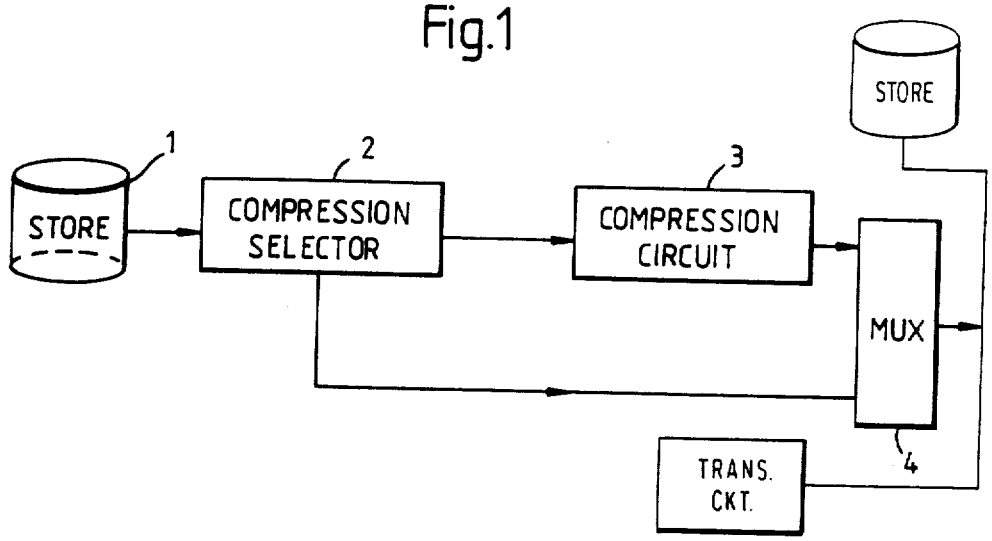
Fig.1
Fig.2A  Fig.2B  Fig.2C
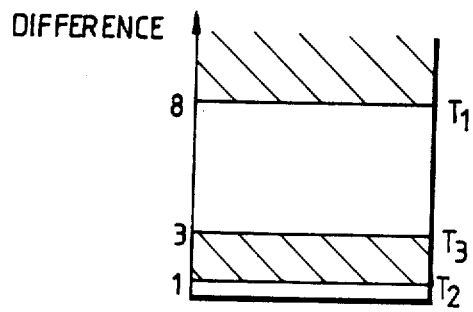
Fig.3

IMAGE PROCESSING

FIELD OF THE INVENTION

The invention relates to methods and apparatus for processing signals defining digital data representing the colour content of abutting blocks of pixels of an image.

DESCRIPTION OF THE PRIOR ART

Currently, images such as pictures or text are frequently encoded into digital data representing the colour content of pixels of the image. A monochrome image will be coded into a single set of pixels defining the gray level content of each pixel while a coloured image will be coded into a number of digital "separations" one for each colour component. This digitisation of an image leads to the generation of a very large amount of data. For example, a typical pixel resolution is 300×300 per sq. inch. It is often necessary to store this data or to transmit the data to a remote station and various techniques have been developed to compress the data in order to reduce the storage space or the transmission time.

In one method, an image is divided into a number of blocks of pixels, the data in each of which is then compressed. We have found that although the technique is generally satisfactory, certain types of pixel blocks cannot be compressed. It is therefore undesirable to apply the compression algorithm to these blocks since the resulting data is little different in terms of quantity from the original data.

SUMMARY OF THE INVENTION

In accordance with one aspect of the present invention, a method of processing digital data representing the colour content of abutting blocks of pixels defining an image comprises for each block
  (i) determining a measure of the variation in colour content of pixels in the block; and,
  (ii) if the variation lies within a predetermined range, applying a compression algorithm to the digital data defining the block.

We have discovered that there are certain well defined types of pixel blocks which can be efficiently compressed while there are other types which cannot. Typically, the types of pixel block which cannot be compressed are those in which the colour content varies significantly from pixel to pixel, i.e. in the frequency domain the block would require many high frequencies to represent it accurately. Such a block might contain a sudden change (edge) in colour. Another type of pixel block which cannot be efficiently compressed is a block in which the colour content varies very little but is not the same for each pixel. An example of such a pixel block is one defining a slow vignette (i.e. a gradual change in colour). In the frequency domain, such a block would require a number of low frequencies to represent it. Thus, the invention detects whether a block of pixels is suitable for application of the compression algorithm before the algorithm is actually applied.

A typical compression algorithm which might be applied would comprise transforming the pixel block into the frequency domain and then encoding the resulting frequency coefficients in accordance with a Huffman type code.

Step (i) could be performed in the frequency domain by determining the energy of the block. This could be determined by summing the squares of all the ac coefficients or of just some of the higher frequency ac coefficients. Preferably, however, step (i) is performed on the block of pixels in the spatial domain since this avoids the necessity of first transforming the block into the transform domain. In the spatial domain, the method could comprise (a) determining for each set of pixels within a window of predetermined dimensions smaller than the block the difference between the colour content values of the pixels and comparing the maximum difference obtained with a pre-determined first threshold;
  (b) determining whether the difference between the values of the pixels with the maximum and minimum colour content values in the block lies within second predetermined limits, the lower limit being greater than zero; and
  (c) applying a compression algorithm to the digital data defining the block if the difference determined in step (a) is less than the first threshold and the difference determined in (b) falls outside the second pre-determined limits.

In step (a) it is determined whether the colour content of the block varies at relatively high frequencies indicating that the block should not be compressed while step (b) determines whether the colour content varies at relatively low frequencies also indicating that the block should not be compressed. Of course, if the colour content is the same throughout the block then the block can be compressed.

Typically, the window will have dimensions of 2×2 pixels.

The first threshold and second limits can be set directly or be represented in any appropriate manner. For example the second limits could be defined by a single value and a range.

In accordance with the second aspect of the present invention, apparatus for processing digital data representing the colour content of abutting blocks of pixels defining an image comprises processing means for
  (i) determining a measure of the variation in colour content of pixels in each block; and, for each block,
  (ii) applying a compression algorithm to the digital data defining the block if the variation lies within a pre-determined range.

Typically, the processing means will be defined by a suitably programmed computer.

BRIEF DESCRIPTION OF THE DRAWINGS

Some examples of methods and apparatus for processing digital data representing the colour content of pixels of an image will now be described with reference to the accompanying drawings, in which:

FIG. 1 is a block diagram of an example of the apparatus;

FIGS. 2A–2C illustrate three different types of pixel blocks;

FIG. 3 illustrates diagrammatically the conditions under which a pixel block is or is not compressed; and, FIGS. 4 and 5 are flow diagrams illustrating methods of processing a pixel block in the spatial and transform domains respectively.

DETAILED DESCRIPTION OF THE EMBODIMENTS

Figure 4:
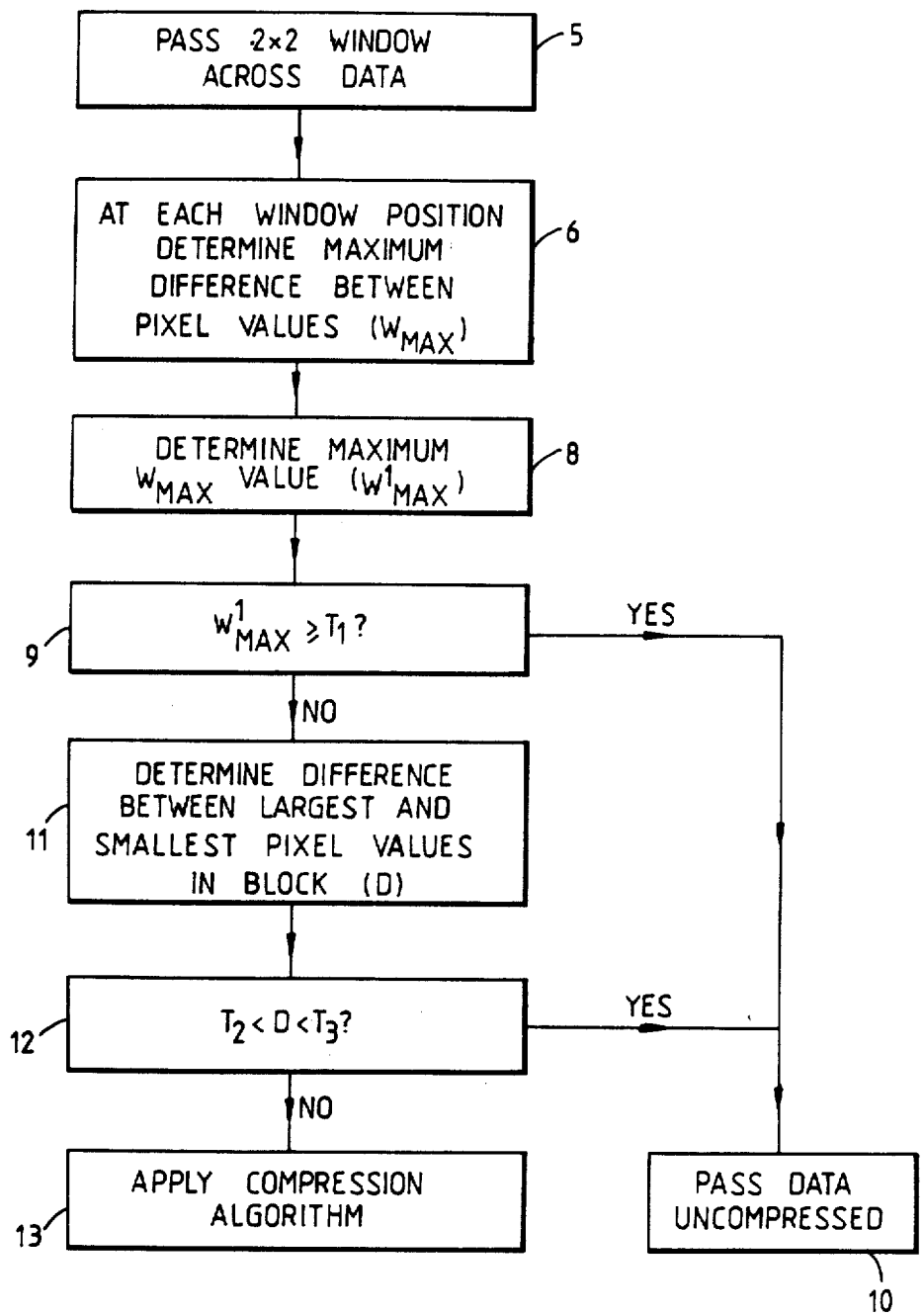

As has been explained above, the invention relates to the processing of digital data representing the colour content of abutting blocks of pixels defining an image. This digital data may have been generated using an input scanner, for example from our Magnascan series, or could have been generated electronically by an operator without any scanning step. This latter method causes particular problems when it is desired to compress the digital data for subsequent storage or transmission. This is because electronically generated images can display very sharp changes in contrast (edges) which are difficult to represent in the transform or frequency domain in view of the need for a large number of high frequency components. In general, representing an image in the frequency domain, for example after applying a fourier transform, leads to a set of data which can be relatively easily compressed by for example Huffman encoding.

It is also difficult to handle sections of an image in which the colour content varies very slowly, for example as in a slowly changing vignette. In this case, if this portion of the image was transformed into the frequency domain it would require very low frequencies to represent it and again this is difficult to encode. However, where the colour content is the same throughout a pixel block, this can be very easily encoded by a single D.C. term in the frequency domain.

In a typical compression system, the original image which may be a coloured or monochromatic picture or text or a combination of both is divided into a number of small blocks of pixels, typically square and for example composed of 8×8 pixels. Each block is then transformed into the frequency domain and the data compressed.

In order to cope with the problems mentioned above, the digital data representing an image and, in this example, stored in a disc store 1 (FIG. 1) is fed to a compression selector circuit 2 which accesses the content of each block of pixels of the image and transfers that block of pixels either to a compression circuit 3 so that the content of the block can be compressed or directly to a multiplexer circuit 4 in an uncompressed state. The output from the compression circuit 3 is also fed to the multiplexer 4 which generates a single output (compressed or uncompressed) which is fed to a store or a transmission circuit in a conventional manner. Although the circuits 2, 3 could be provided by hardware components, typically they will be defined by a suitably programmed computer.

The assessment of the content of a pixel block can be performed on a representation of the block in either the spatial domain or the frequency domain. It is preferred to work in the spatial domain since this avoids the need to transform the data into the frequency domain and subsequently back into the spatial domain if it is decided that compression is not appropriate.

FIG. 4 is a flow diagram illustrating the series of steps which are performed on each pixel block represented in the spatial domain. For the sake of this example, 3×3 pixel blocks will be considered and three examples of such blocks are illustrated in FIGS. 2A-2C. In the case of a monochrome image, there will be one set of pixel blocks whereas in the case of a coloured image there will be a number of sets, one for each colour component. In this latter case, the method to be described is carried out on each block of each colour component representation. In order to further simplify this explanation, the data values in each block are represented by decimal numbers ranging between 0 and 10 whereas in practice the range is typically between 0 and 255 for each colour component.

In a first step 5, a 2×2 window is passed around the pixel block. At each position of the window within the block, the digital data values of the pixels within the window are determined and the difference $W_{max}$ between the largest digital value and the smallest digital value is determined (step 6).

Considering the pixel block of FIG. 2A if a window is positioned as shown by reference numeral 7A then the difference $W_{max}=1$. Similarly for the blocks shown in FIGS. 2B and 2C the values when the windows are in positions 7B and 7C respectively are 9 and 6.

A series of values for $W_{max}$ is generated for each of the four window positions. In the case of FIG. 2A these values will be 1, 1, 0, 1 respectively. The maximum value for $W_{max}$ is then determined ($W_{max}'$) in step 8. In the case of the FIG. 2A block, $W_{max}'=1$. For the figures 2B and 2C blocks the values for $W_{max}'$ are 9 and 6 respectively.

In a step 9 the value of $W_{max}'$ is compared with a first threshold $T_1$. If $W_{max}'$ greater than or equal to $T_1$, this indicates that the block is unsuitable to be compressed since it would require a number of high frequency terms to represent it in the frequency domain. The value of $T_1$ is set empirically and in this example is shown to have the value 8 (FIG. 3). Thus, the result of step 9 is that the block of FIG. 2B is found to be unsuitable for compression while the blocks of FIG. 2A and 2C must undergo further processing. When the block of FIG. 2B has been assessed in this way, the data is fed directly to multiplexer 4 so that it is passed uncompressed (step 10).

Blocks which satisfy the condition $W_{max}'<T_1$ undergo a further assessment. Initially, in a step 11 the largest and smallest pixel values within the entire block are determined and then the difference (D) between these pixel values is calculated. In FIG. 2A D=1, in FIG. 2B D=9, and in FIG. 2C D=7.

In a step 12 D is compared with two relatively low thresholds $T_2$, $T_3$ which again are determined empirically (in the FIG. 3 example $T_2=1$, $T_3=3$) and which define a range of block energies unsuitable for data compression due to the very low frequencies required to represent the block in the frequency domain.

In this particular example, it is found that the FIG. 2A block falls within the range and thus the digital data within that block should be passed uncompressed direct to the multiplexer 4. However, the data within the blocks of FIGS. 2B and 2C lies above the threshold $T_3$ and is thus suitable for compression and the compression algorithm is applied in a step 13. This may take any conventional form but typically comprises transforming the block of data into the frequency domain and then Huffman encoding the coefficients.

Figure 5:
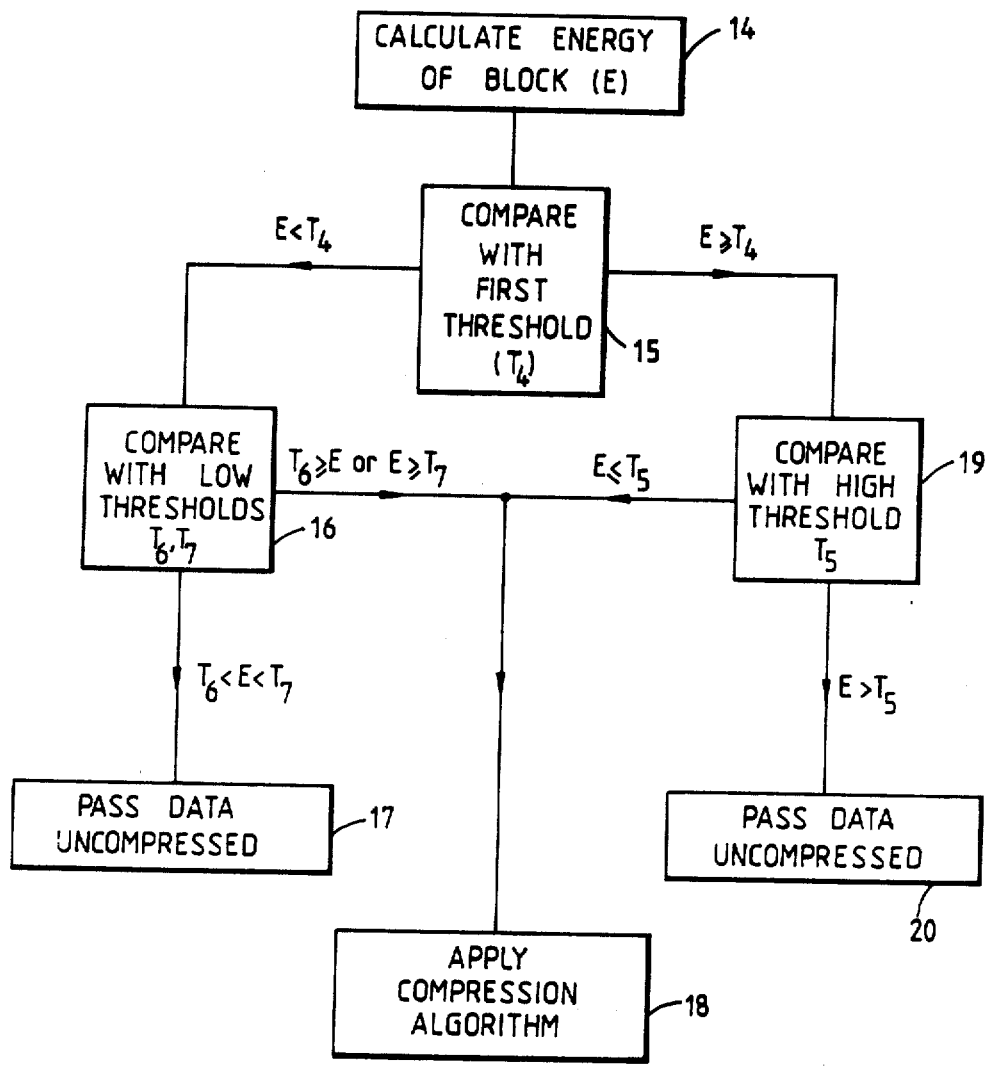

In some cases, as mentioned above, it may be desirable to assess the compressibility of a pixel block from a representation of that block in the frequency domain. In the frequency domain, the digital data is represented by a D.C. term and a number of A.C. coeffients, the total number of data values being equal to the number of pixels in the block (although a large number of these may be zero). In this method, an energy measure of the pixel block is determined in a step 14 (FIG. 5) by summing the squares of all the A.C. coeffients. This energy (E) is then compared with a first threshold $T_4$ (Step 15) which provides a first indication of whether the energy is generally low or high. If E is less than $T_4$ (low energy) then E is compared (Step 16) with a pair of low thresholds $T_6$, $T_7$ (corresponding to thresholds $T_2$, $T_3$) to determine whether the low energy of the block falls within the particular range which should not be compressed. If E lies within this range, the data is passed uncompressed, step 17. Otherwise the data is fed to the compression circuit 3 and the compression algorithm is applied (Step 18).

If step 15 determines that the energy of the block is generally high, the energy E is then compared to a high threshold $T_5$ in the step 19 (corresponding to threshold $T_1$). If the energy is greater than the threshold $T_5$ the data is passed uncompressed (Step 20), otherwise the data is compressed.

Typically, in this case, a representation of the pixel block in the spatial domain will be retained so that if the data is to be passed uncompressed, this spatial respresentation can be passed directly to the multiplexer 4. Alternatively, the transformed data could be inversely transformed back into the spatial domain.

We claim:

1. A method of processing digital data representing the colour content of abutting blocks of pixels defining an image, the method comprising, for each said block
   (i) applying a predetermined algorithm to digital data defining the color content of pixels in said block to determine a measure of the variation in colour content of pixels in said block;
   (ii) if the measure lies within a predetermined range, applying a compression algorithm to said digital data defining said block to provide compressed digital data, and feeding said compressed digital data to one of a store and a transmission circuit; and
   (iii) if the measure does not lie within said predetermined range, feeding said digital data as uncompressed digital data to one of said store and said transmission circuit, 2. A method according to claim 1, wherein step (i) is performed in the frequency domain in which said block is represented by a DC term and a plurality of ac coefficients, step (i) comprising determining the energy (E) of said block by summing the squares of all said ac coefficients.

3. Apparatus according to claim 1, wherein said compression algorithm comprises an algorithm employing Huffman encoding.

4. A method according to claim 1, wherein step (i) is performed on said block of pixels in the spatial domain.

5. A method according to claim 4, comprising
   (a) determining for each set of pixels within said window which is of predetermined dimensions smaller than said block the difference between the colour content values of the pixels and comparing the maximum difference ($W_{max}'$) obtained with a predetermined first threshold ($T_1$);
   (b) determining whether the difference (D) between the values of the pixels with the maximum and minimum colour content values in said block lies within second predetermined limits ($T_2, T_3$), the lower limit being greater than zero; and
   (c) applying a compression algorithm to said digital data defining said block if the difference ($W_{max}'$) determined in step (a) is less than said first threshold ($T_1$) and the difference (D) determined in (b) falls outside said second pre-determined limits ($T_2, T_3$).

6. Apparatus for processing digital data representing the content of abutting blocks of pixels defining an image, the apparatus comprising:
   (i) means for applying a predetermined algorithm to digital data defining the colour content of pixels in said block to determine a measure of the variation in colour content of pixels in each block;
   (ii) means for applying a compression algorithm to the digital data defining said block to provide compressed digital data if the measure lies within a pre-determined range;
   (iii) means, responsive to said determining means and said applying means, for feeding said compressed digital data to one of a store and a transmission circuit, and for uncompressed digital data to one of said store and said transmission circuit if said measure does not lie within said predetermined range.

7. Apparatus according to claim 6, wherein said determining means, said applying means, and said feeding means comprises a suitably programmed computer system.

8. Apparatus according to claim 6, wherein said compression algorithm comprises an algorithm employing Huffman encoding.

* * * * *